(12) United States Patent  
Murasato

(10) Patent No.: US 7,031,082 B2
(45) Date of Patent: Apr. 18, 2006

(54) RETAINER, EXPOSURE APPARATUS, AND DEVICE FABRICATION METHOD

(75) Inventor: Naoki Murasato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/781,412

(22) Filed: Feb. 17, 2004

(65) Prior Publication Data

US 2004/0165287 A1 Aug. 26, 2004

(30) Foreign Application Priority Data

Feb. 17, 2003 (JP) ............................. 2003-037565

(51) Int. Cl.
  G02B 7/02 (2006.01)
  G02B 5/08 (2006.01)
  G02B 26/08 (2006.01)
(52) U.S. Cl. ............... 359/819; 359/822; 359/824; 359/846; 359/849; 359/291; 359/298
(58) Field of Classification Search .............. 359/819, 359/822, 824, 846, 849, 214, 221, 291, 298
See application file for complete search history.

(56) References Cited

U.S. PATENT DOCUMENTS

| | | | | |
|---|---|---|---|---|
| 5,917,647 A | * | 6/1999 | Yoon | 359/298 |
| 6,275,326 B1 | * | 8/2001 | Bhalla et al. | 359/298 |
| 6,386,714 B1 | * | 5/2002 | Eggleton et al. | 359/846 |
| 6,411,426 B1 | * | 6/2002 | Meehan et al. | 359/291 |
| 6,700,715 B1 | * | 3/2004 | Sorg et al. | 359/824 |
| 6,840,638 B1 | * | 1/2005 | Watson | 359/849 |
| 6,842,277 B1 | * | 1/2005 | Watson | 359/291 |

FOREIGN PATENT DOCUMENTS

JP  11-149029  6/1999

* cited by examiner

Primary Examiner—Loha Ben
(74) Attorney, Agent, or Firm—Morgan & Finnegan, L.L.P.

(57) ABSTRACT

A retainer for holding an optical element includes a detector for detecting a deformation amount of the optical element, and an adjustment unit for adjusting the deformation of the optical element based on the deformation amount.

38 Claims, 10 Drawing Sheets

RETAINER, EXPOSURE APPARATUS, AND DEVICE FABRICATION METHOD

This application claims a benefit of priority based on Japanese Patent Application No. 2003-037565, filed on Feb. 17, 2003, which is hereby incorporated by reference herein in its entirety as if fully set forth herein.

BACKGROUND OF THE INVENTION

The present invention relates generally to precision machines for mounting an optical element, and more particularly to a projection optical system in an exposure apparatus, etc. The present invention is suitable, for example, for a retainer that holds an optical element for a more precise imaging relationship in an exposure apparatus in projecting and exposing an image on an original sheet, such as a mask or reticle (these terms are used interchangeably in this application) onto an object, such as a single crystal substrate for a semiconductor wafer, a glass plate for a liquid crystal display (LCD). The exposure apparatus is used to fabricate a semiconductor device, an image pick-up device (such as a CCD), and a thin film magnetic head.

The fabrication of a device using the lithography technique has employed a projection exposure apparatus that uses a projection optical system to project a circuit pattern formed on a mask onto a wafer and the like, thereby transferring the circuit pattern. The projection optical system enables diffracted beams from the circuit pattern to interfere on the wafer and the like, so as to form an image.

The devices to be mounted on electronic apparatuses should be highly integrated to meet recent demands for miniaturization and low profile of electronic apparatuses, and finer circuit patterns to be transferred or higher resolution have been demanded increasingly. A short wavelength of a light source and an increased numerical aperture ("NA") in a projection optical system are effective to the high resolution as well as a reduced aberration in the projection optical system.

An optical element, such as a lens and a mirror, when deforming in an projection optical system causes aberration because an optical path refracts before and after the deformation and light that is supposed to form an image at one point does not converge on one point. The aberration causes a positional offset and short-circuits a circuit pattern on a wafer. On the other hand, a wider pattern size to prevent short-circuiting is contradictory to a fine process. Therefore, a projection optical system with small aberration should hold its optical element(s) without changing a shape and a position relative to the optical axis of the optical element in the projection optical system so as to maximize the original optical performance of the optical element. In particular, the projection lens tends to have a larger caliber and a larger lens capacity due to the recent high NA in the projection optical system, and easily deforms by its own weight. In addition, diffraction optical elements, which have been eagerly studied recently, also tend to deform due to its thinness.

Accordingly, a conventional retainer has used a screw ring or ball pushing to compress and fix the top of an optical element that has been supported at its entire peripheral by a metal frame, or supported the optical element at three points at regular intervals in its circumferential direction.

Alternatively, Japanese Patent Application Publication No. 11-149029 proposes a retainer that supports an optical element using three optical-element support members provided at regular intervals in its circumferential direction, and elastic members that push up against the gravity the circumferential part of the optical element supported by the support members.

A metal-frame support of the entire peripheral of the optical element actually results in three point supports or contacts at irregular angles, because the metal frame that contacts the optical element has an undulated support surface unfit for the optical element's contact surface shape. As a result, this support transforms the optical element's surface, and deteriorates the optical element's optical.

On the other hand, the three points supports of the optical element at regular interval in a circumferential direction cause optical element's own weight deformations at these three points of the support members. In particular, a large aperture lens deforms significantly by its own weight, undesirably deteriorating its optical performance.

Moreover, the retainer proposed in Japanese Patent Application Publication No. 11-149029, varies forces applied to the elastic members that push up the optical element against gravity or forces directly applied to the optical element according to material's physical performance and size, and has a difficulty in precise control over the relative accuracy among the forces applied to the elastic members. Thereby, the non-uniform loads applied to respective elastic members deform the optical element.

In other words, the conventional optical-element retainers have not yet contributed to a high-resolution projection optical system with less aberration which prevents optical element's deformations which would otherwise cause deteriorated imaging performance, and meets fine processing requests.

BRIEF SUMMARY OF THE INVENTION

Accordingly, it is an exemplified object of the present invention to provide a retainer, an exposure apparatus, a device fabrication method which may provide desired optical performance by reducing aberration due to a deformation of an optical element which otherwise deteriorates the imaging performance.

A retainer of one aspect according to the present invention for holding an optical element includes a detector for detecting a deformation amount of the optical element, and an adjustment unit for adjusting the deformation of the optical element based on the deformation amount.

The detector may be a strain gauge. The detector may be arranged on the optical element. Three detectors may be arranged on the same circumference at a pitch of 120°. The adjustment unit may equalize a load applied to the optical element. The adjustment unit may adjust the load applied to the optical element to reduce aberration of the optical element. The adjustment unit may include a coil spring. The adjustment unit may include an adjustment screw for adjusting a length of the coil spring. Three adjustment units may be arranged on the same circumference at a pitch of 120°. The retainer may further include a support part that supports the optical element at approximately three points.

There may be three detectors and three support parts, wherein each detector is arranged between two adjacent supports parts. There may be three adjustment units and three support parts, wherein each detector is arranged between two adjacent supports parts. The number of adjustment units may be more than the number of detectors, and the adjustment units are driven based on detection results by the detectors. The retainer may further include a support part that supports the optical element at approximately three points, wherein the adjustment unit is provided every space between adjacent two points among the three points, and the detector is located at least one of the spaces among the three points. The detector and the adjustment unit may be integrated with each other. The adjustment unit may include a component, and the detector may detect the deformation amount by using the component in the adjustment unit. The adjustment unit may include a component, and the detector may detect the deformation amount by measuring a strain amount of the component in the adjustment unit.

A retainer of another aspect according to the present invention for holding an optical element includes an adjustment unit for adjusting a shape of the optical element, the adjustment unit including a component, and a detector for detecting a deformation amount of the component in the adjustment unit, the adjustment unit adjusting the shape of the optical element based on a detection result by the detector. The retainer may further include a support part for supporting the optical element at approximately three points, and the adjustment units may be arranged at intervals of the approximately three points.

An adjustment method of still another aspect according to the present invention for adjusting a shape of the optical element into a desired shape includes the steps of obtaining the shape of the optical element, calculating a force to be applied to the optical element to correct the shape of the optical element into the desired shape, and applying the force calculated by the calculating step to the optical element. The adjustment method may further include the steps of detecting wave front aberration of the optical element, and applying the force to the optical element so that the wave front aberration falls within a permissible range.

An exposure apparatus of another aspect according to the present invention includes the above retainer, and an optical system for exposing a pattern formed on a mask or reticle onto an object through the optical element held by the retainer.

A device fabrication method of another aspect of the present invention includes the steps of exposing a pattern on a mask, onto an object by using the above exposure apparatus, and developing the exposed object. Claims for the device fabrication method that exhibits operations similar to those of the above exposure apparatus cover devices as their intermediate products and finished products. Moreover, such devices include semiconductor chips such as LSIs and VLSIs, CCDs, LCDs, magnetic sensors, thin-film magnetic heads, etc.

Other objects and further features of the present invention will become readily apparent from the following description of the embodiments with reference to accompanying drawings.

DETAILED DESCRIPTION OF THE PREFERRED EMBODIMENTS

Referring now to accompanying drawings, a description will be given of an illustrative retainer 100 and exposure apparatus 200 of the present invention. However, the present invention is not limited to these embodiments, and each element may be replaced within a scope of this invention. For example, although the retainer 100 is applied to a projection optical system 230 in the exposure apparatus 200 in the instant embodiment, it is applicable to an illumination optical system 214 in the exposure apparatus 200 and other known optical systems.

Figure 1:
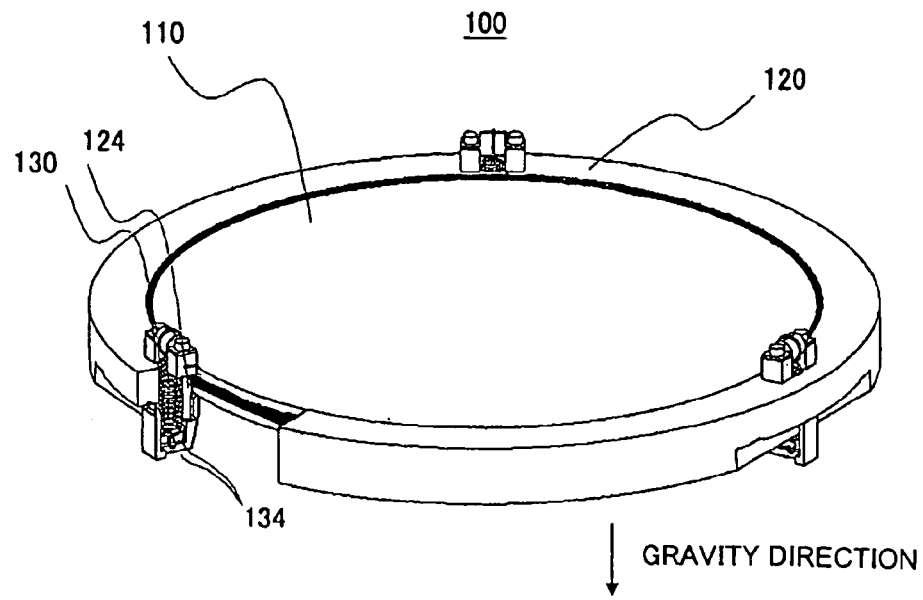
FIG. 1 is a schematic, partially sectional, perspective view of an inventive retainer that holds an optical element.
Figure 2:
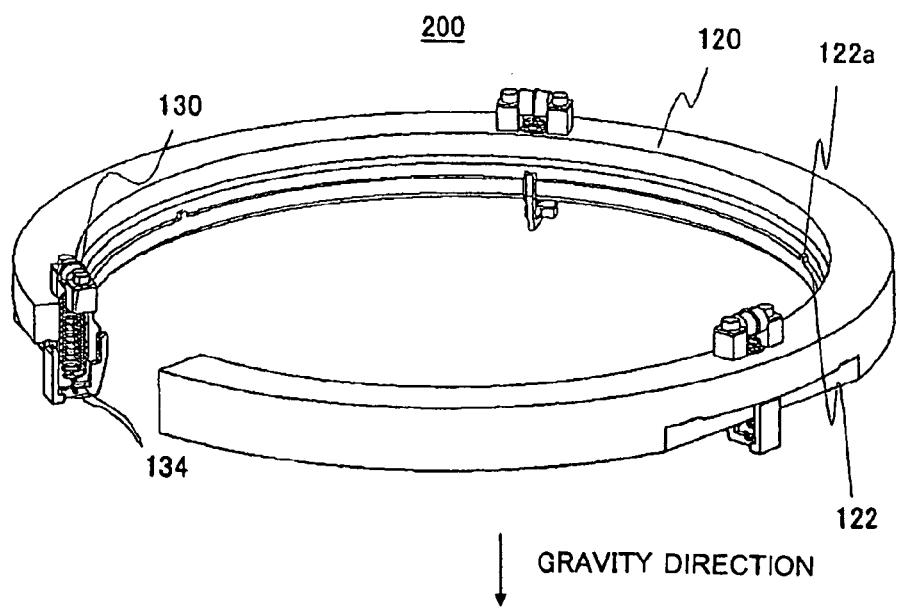
FIG. 2 is a schematic, partially sectional, perspective view of the inventive retainer without the optical element.

Here, FIGS. 1 and 2 are schematic, partially sectional, perspective views of the inventive retainer 100 applied to the projection optical system 230 in the exposure apparatus 200, wherein FIG. 1 is a view of the retainer 100 that has an optical element 110, and FIG. 2 is a view of the retainer 100 without the optical element 110. The gravity direction is parallel to the optical axis of the optical element 110, as shown in an arrow direction in FIG. 1. When the optical axis of the optical element is parallel to the gravity direction, the gravity deformation of the optical element becomes the largest and the gravity deformation often affects the optical performance. Therefore, the instant embodiment applies the present invention to a case where the optical axis of the optical element 110 is parallel to the gravity and anti-gravity directions. Like elements in respective figures are designated by the same reference numerals, and a description thereof will be omitted.

The retainer 100 includes, as shown in FIGS. 1 and 2, a retaining member 120 and an adjustment unit 130, holds the optical element 110, and controls 30 deformations in the optical element 110.

The optical element 110 is mounted on the retaining member 120, which will be described later, and images light using reflections, refractions, diffractions, etc. The optical element 110 is supported by a support part 122 in the retaining member 120, and jointed with the retaining member 120 via a joint part 124 over its circumference. The optical element 110 includes, for example, a lens, a parallel plate glass, a prism, a mirror, and a Fresnel zone plate, a kinoform, a binary optics, a hologram, and other diffraction optical elements.

The retaining member 120 provides three support parts 122 for holding the optical element 110 in the gravity direction, at a pitch of 120° at the outermost peripheral outside an optically used effective area of the optical element 110, and mounts the optical element 110 on these support parts 122. The retaining member 120 is a ring member formed around the optical axis, and made, for example, of copper alloy, such as brass, stainless steel, iron, low thermal expansion metal, such as Invar alloy, carbon steel, and ceramic.

A support surface 122a of the support part 122 provided in the retaining member 120 or a surface that contacts the optical element 110 preferably has a small area not to damage the optical element 110 in placing the optical element 110 on the retaining member 120 so that a simulated value is substantially the same as the estimated deformation amount of the optical element 110 which occurs due to the optical element 110's own weight after the optical element 110 is placed on the retaining member 120.

The joint part 124 is located on an inner surface of the retaining member 120, and, secures the optical element 110 and the retaining member 120 along the circumference of the optical element 110. While the instant embodiment uses adhesive for joints, a mechanical joint, such as a flat spring, can be used for joints.

The adhesive preferably has a rubber hardness of 70 or smaller after adhered and hardened. In addition, it has such a hardness contraction characteristic that the hardened contraction after it is adhered and hardened does not substantially deform the optical element 110. Preferably, degas from the adhesive does not deteriorate the optical performance of the optical element 110.

The deteriorated optical performance of the optical element 110 caused by degas from the adhesive includes deteriorated transmittance due to adhesions of degas onto the optical element 110 and a reaction product between the degas and exposure light onto the optical element 110.

The deteriorated transmittance lowers, for example, the throughput of the exposure apparatus, and the instant embodiment uses Three Bond Co.'s TB1230 as the adhesive that does not cause such influence.

The adjustment unit 130 controls a surface shape of the optical element 110 placed on the retaining member 120. Three adjustment units 130 are provided at three points at regular intervals in the circumferential direction, and each point is a midpoint between two adjacent support parts 122 in the retaining member 120 for holding the optical element 110.

Figure 3:
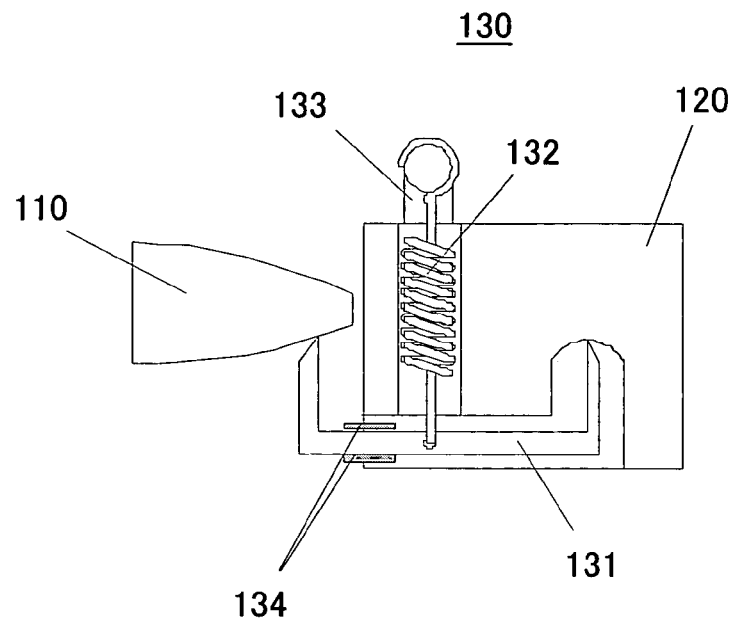
FIG. 3 is a schematic sectional view of one example of an adjustment unit shown in FIG. 1.

FIG. 3 illustrates a schematic sectional view of the adjustment unit 130. The adjustment unit 130 includes, as shown in FIG. 3, a hook 131, an elastic member 132, and a spacer 133, and a strain gauge 134.

The hook 131 contacts bottom surfaces of the optical element 110 and the retaining member 120, and transmits a force to deform the optical element 110 into a desired shape.

The elastic member 132 generates a force to deform the optical element 110 into a desired shape. The instant embodiment uses a tension spring for the elastic member 132, but can use a flat spring and other spring element instead.

The spacer 133 is attached to the retaining member 120. One of both ends of the spacer 133 is connected to the spacer 133 on the retaining member 120, and the other is connected to the hook 131. An adjustment of a spacer 133's height would be able to create a desired force in the elastic member 132. The generated force in the elastic member 132 is transmitted to the optical element 110 through the hook 131, providing the optical element 110 with a desired deformation amount.

The strain gauge 134 is adhered or fixed onto the top and bottom surfaces of the hook 131 in FIG. 3. The instant embodiment provides the strain gauge 134 to accurately know a force transmitted from the hook 131 to the optical element 110. The instant embodiment assumes that a deformation amount applied to the optical element 110 is too minute to be measured, and replace the deformation amount with a force that applies a desired deformation.

The adhesive used to adhere and fix the strain gauge 134 preferably emits less degas to maintain the optical performance. The less elastic adhesive is preferable so that a minute strain on a measurement surface or a contact surface with the hook 131 transmits to the strain gauge 134.

Figure 4:
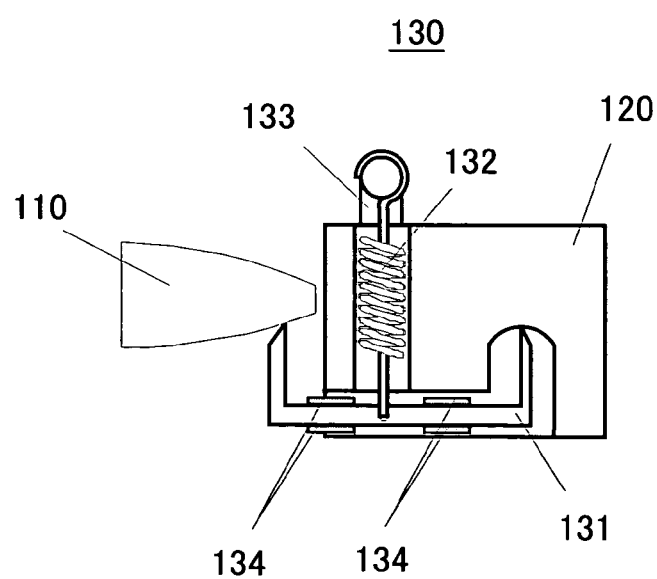
FIG. 4 is a schematic sectional view of another example of the adjustment unit shown in FIG. 1.

The strain gauge 134 can measure a finer deformation amount, as shown in FIG. 4, when plural strain gauges 134a and 134b are adhered and fixed onto the top and bottom surfaces of the 131. Here, FIG. 4 is a schematic sectional view of another example of the adjustment unit 130 shown in FIG. 1.

Figure 5:
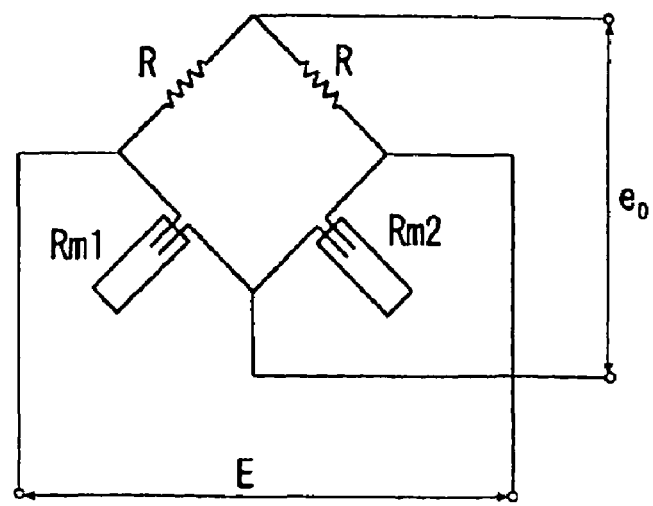
FIG. 5 is a circuitry of a bridge circuit that uses a strain gauge.

FIG. 5 is a circuitry of a bridge circuit that uses the strain gauge 134. Referring to FIG. 5, the strain gauge 134 includes a bridge circuit with a resistor R of 120 Ω, and reads an output from a converter (not shown) that is connected to the strain gauge 134. The load applied to the optical element 110 is detectable with precision by previously obtaining a relationship between values from the strain gauge 134 and forces applied to the retaining member 120.

A description will now be given of a mechanism of the bridge circuit. R is fixed resistance, and $Rm_2$ is the strain gauge 134 adhered and fixed onto the lower part of the hook 131. An output voltage $e_o$ from the bridge circuit is expressed by Equation 1 below, where E is a predetermined bridge voltage, $K_s$ is a gauge ratio of the strain gauge, and $\epsilon_0$ is a strain amount:

$$e_0 = \frac{E}{2} K_s \epsilon_0 \qquad (1)$$

For example, the output voltage $e_0$ becomes 1 mV when strain amount $\epsilon_0 = 100 \times 10^{-6}$, the bridge voltage E is 10 V, the gauge ratio $K_s = 2$. Thus, the output voltage can be obtained according to strain amounts of the strain gauge. Equation 1 indicates that there is a linear relationship between the strain amount and the output voltage. In order to more accurately measure the bridge circuit shown in FIG. 5, a bridge circuit that includes four strain gauges can be used by replacing two fixed resistors R with the strain gauge 134 at the side of the retaining member 120. Thereby, the output-voltage sensitivity becomes doubled to the strain amount for more precise measurements.

A description will now be given of a procedure of adhering the optical element 110 onto the retaining member 120. First, the optical element 110 is placed on three support parts 122 in the retaining member 120. Center positions of the optical element and the retaining member 120 have certain circularity so that the joint parts 124 have a uniform thickness between the optical element 110 and the retaining member 120.

After the optical element 110 is placed on the support parts 122 in the retaining member 120, centers of the optical element 110 and the retaining member 120 are aligned with each other so that a clearance amount between the optical element 110 and the retaining member 120 is uniform and constant over the entire circumference. When the clearance amount between the optical element 110 and the retaining member 120 becomes uniform and constant, the adhesive is injected into the joint part 124 through a dispenser or the like that can control an injection amount. An optimization of an amount of the adhesive to be injected into the joint part 124 would be able to control the mechanical rigidity of the joint part 124 as an elastic member that connects the optical element 110 and the retaining member 120 to each other.

The instant embodiment needs to deform the joint part 124 when the retaining member 120 transmits a force to the optical element 110, in providing the optical element 110 with a desired deformation amount through the adjustment unit 130. Control over deformations of the joint part 124 needs to control an elastic constant of the joint part 124 as an elastic member to a predetermined value. In using a flat spring to fix the optical element 110 onto the retaining member 120, the elastic constant of the flat spring can be controlled.

After the optical element 110 is adhered and fixed onto the retaining member 120, the adjustment units 130 arranged at three points in the retaining member 120 are used to apply forces to the optical element 110 by changing a thickness of the spacer 133 to a desired thickness. The force applied to the optical element 110 can be accurately read by monitoring the output of the strain gauge 134. Thus, a desired displacement can be provided each of the three points on the optical element 110. The provisions of displacements to the optical element 110, which cancel out 3θ self-weight deformations caused when the optical element 110 is held by the retaining member 120, can reduce a deformation of the optical element 110 which negatively affects its optical performance.

Use of the retainer 100, for example, to hold an optical element in a projection optical system in an exposure apparatus would be able to reduce-influence of the self-weight deformation of the optical element that has been supported at three points. This structure can retain the optical element while reducing the self-weight deformation of the large aperture optical element for a high NA exposure apparatus, and exposure performance significantly increases without being negatively affected by the deformed optical element.

Figure 6:
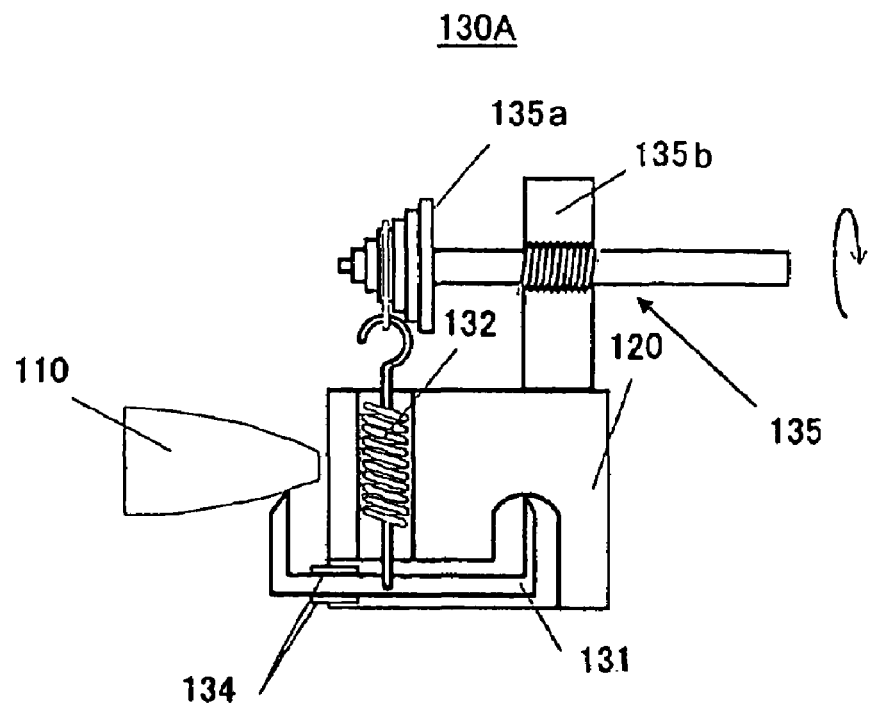
FIG. 6 is a schematic sectional view of a variation of the adjustment unit shown in FIG. 1.
Figure 7:
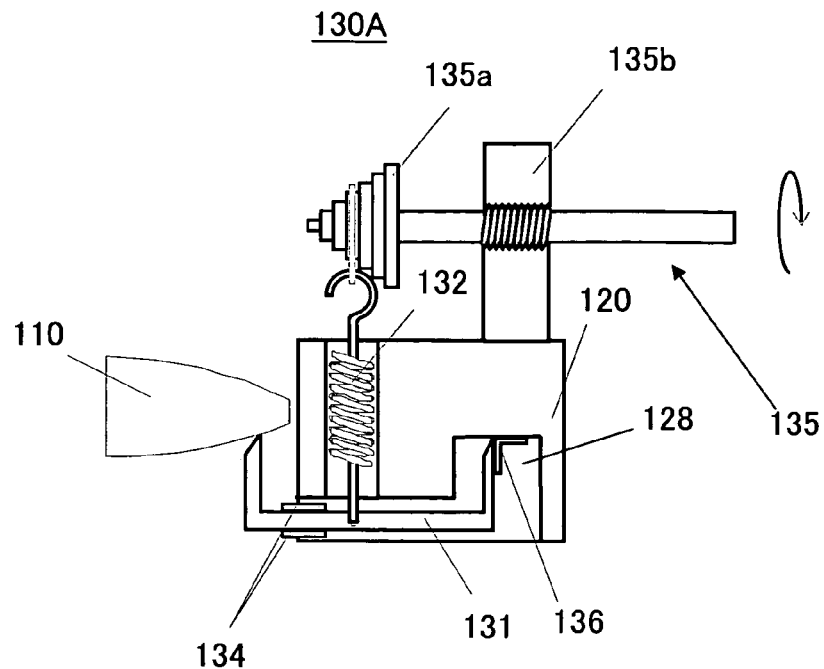
FIG. 7 is a schematic sectional view of an exemplary adjustment unit that has an improved contact portion between a retaining member and a hook.
Figure 8:
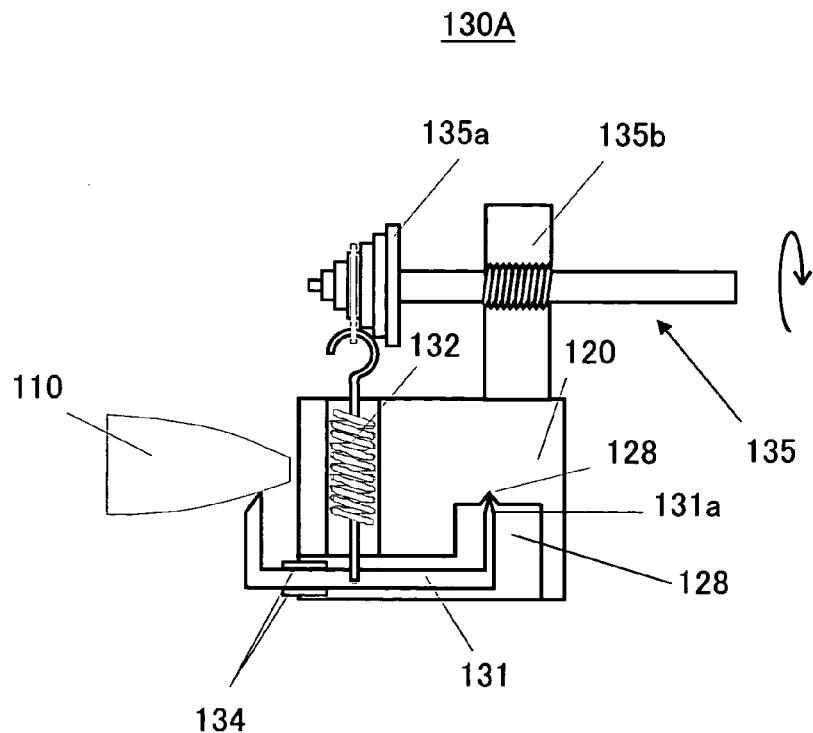
FIG. 8 is a schematic sectional view of an exemplary adjustment unit that has an improved contact portion between the retaining member and the hook.

Referring now to FIGS. 6 to 8, a description will be given of an adjustment unit 130A as a variation of the adjustment unit 130. FIG. 6 is a schematic sectional view showing one example of the adjustment unit 130A as a variation of the adjustment unit 130. The adjustment unit 130 adjusts the force in the elastic member 132 by adjusting the height of the spacer 133, whereas the adjustment unit 130A adjusts the force in the elastic member 132 outside the retaining member 120. The adjustment unit 130A includes, as shown in FIG. 6, the hook 131, the elastic member 132, the strain gauge 134, and an adjustment screw 135.

The adjustment screw 135 has a cone, spiral part 135a at its top, and one end of the elastic member 132 is attached to the spiral part 135a. As the adjustment screw 135 rotates, the adjustment screw 135 proceeds and the end of the elastic member 132 attached to the spiral part 135a can change its position in a longitudinal direction in FIG. 6. Therefore, as the adjustment screw 135 is rotated from the outside of the retaining member 120, the length of the elastic member 132 can be adjusted to apply a desired force to the optical element 110. Since the adjustment screw 135 uniformly adjusts the length of the elastic member 132 around the rotating angle of the screw, an axis of the adjustment screw 135b connected to the retaining member 120 and an axis of the spiral part 135a must be co-axial. The spiral part 135a even when having a cone shape in the adjustment screw 135 can obtain similar functions by variably sliding the elastic element 132 in the longitudinal direction.

When the hook 131 that contacts the optical element 110 offsets in the horizontal direction, the load to the optical element 110 can vary, throw off balance of the optical element 110, deteriorate the surface shape or cause inconsistency with a design value. Accordingly, as shown in FIG. 7, a fixing member 136 is attached to a contact area 128 between the retaining member 120 and the hook 131 to fix the hook 131 and prevent a horizontal offset. Here, FIG. 7 is a schematic sectional view showing one example of the adjustment unit 130A that has the improved contact area 128 between the retaining member 120 and the hook 131.

The fixing member 136 is fixed onto the hook 131 in the horizontal direction and made, for example, of a thin plate. A thickness of the fixing member 136 is designed such that the bending stress of the fixing member 136 is much lower than the force generated in the elastic member 132 so as not to negatively affect control over a shape of the optical element 100.

As shown in FIG. 8, the hook 131 can have a fixed position with a reduced or eliminated horizontal offset by forming an acute shape at the end 131a of the hook 131 which contacts the retaining member 120, and providing the area 128 in the retaining member 120 for receiving the end 131a of the hook 131 (i.e., the contact area between the retaining member 120 and the hook 131), with a cone or V-shaped groove 128a. In this case, the end 131a of the hook 131 and the groove 128a in the retaining member 120 are preferably sharper within a permissible rigidity range so that the hook 131 does not shift in the horizontal direction even when receiving a large lateral force. Here, FIG. 8 is a sectional view showing another example of the adjustment unit 130A that has the improved contact area 128 between the retaining member 120 and the hook 131.

The adjustment unit 130A adjusts the force to be generated by the elastic member 132 from the outside of the retaining member 120 or a length of the elastic member 132, and controls 3θ deformations of the optical element 110. Therefore, the adjustment unit 130A can control a shape of the optical element 110 from the outside, for example, of a lens barrel for the optical element 110.

The lens barrel as a whole includes the wave front aberration occur due to the 3θ deformations of the plural optical elements 110, assembly errors, homogeneity, etc. Control over the force generated in the elastic member 132 in the adjustment unit 130A can minimize the wave front aberration. It is conceivable to compulsorily increase the 3θ deformations of the plural optical elements 110 so as to cancel out the wave front aberration. A combination of independent adjustments of 3θ deformations of plural optical elements 110 would vary the wave front aberration can change in a wider range. The optical element 110 that is highly sensitive to the wave front aberration thus can adjust the wave front aberration in a wide range. The optical element 110 that is not so sensitive to the wave front aberration thus can adjust the wave front aberration with high resolution.

An installment of electromotive equipment, such as an actuator, for rotating the adjustment screw 135 would rotate the adjustment screw 135 without direct access to inside of the lens barrel. Thereby, the lens barrel does not have to include a hole for access to the inside of the lens barrel, and the adjustment screw 135 can be rotated with high precision and resolution. Thus, the optical element 110 can be adjusted to a desired shape by monitoring an output of the strain gauge 134 adhered and fixed onto the hook 131, and by controlling a rotation of the adjustment screw 135 based on this value.

Figure 9:
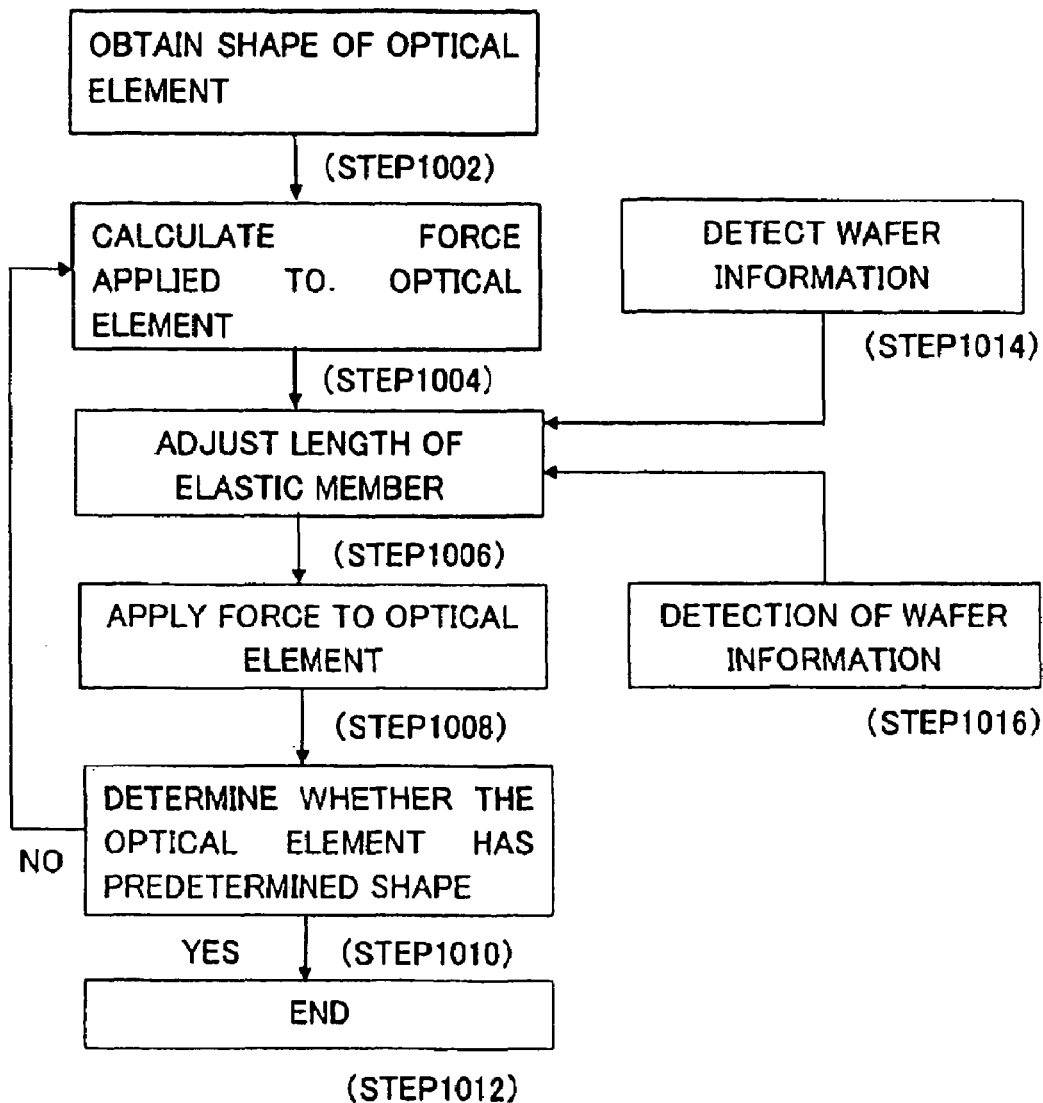
FIG. 9 is a flowchart for explaining an adjustment method for adjusting a shape of an optical element held by the retainer shown in FIG. 1.

A description will now be given of a method for actively controlling a shape of the optical element 110 by feedback control using the retainer 100. FIG. 9 is a flowchart of an adjustment method 1000 for adjusting a shape of the optical element 110 held by the retainer 100.

When the optical element 110 deforms its shape, a change of an output of the strain gauge 134 attached to the retaining member 120 provides a deformed shape of the optical element 110 (step 1002). Then, the force that is necessary to change the deformed optical element 110 into a desired shape and to be applied to the optical element 110 from the elastic member 132 is calculated (step 1004). A length of the elastic member 132 is adjusted so that the elastic member 132 creates the calculated force (step 1006). The calculated force is applied to the optical element 110 (step 1008). After the optical element 110 is forced, the strain gauge 134 measures a shape of the optical element 110, and it is determined whether the optical element 110 has a desired shape (step 1010). When the optical element 110 has a desired shape, the control over the shape of the optical element 110 ends (step 1012). When the optical element 110 does not have a desired shape, the procedure subsequent to the step 1004 is repeated. A relationship between a shape of the optical element 110 and an output of the strain gauge 134 has been previously obtained. The feedback control over the shape of the optical element 110 is thus available by using the strain gauge 134 as a detector of a shape of the optical element 110.

The optical element 110 generates wave front aberration due to errors, such as a self-weight deformation, a surface shape error, and homogeneity, and this wave front aberration should fall within a desired range. In this case, a wave front aberration measuring apparatus that directly measures the wave front aberration of the optical element 110 detects the wave front aberration in the optical element 110 (step 1014), and adjusts a length of the elastic member 132 so that the detected wave front aberration falls within a permissible range for feedback control (step 1006).

The exposure apparatus mounted with the retainer 100 that holds the optical element 110 uses means for detecting a wafer pattern to always detect a wafer (step 1016), and adjust a length of the elastic member 132 based on the detected wafer information for feedback control (step 1006). This feedback control can realize an active lens or mirror for always controlling a shape of the optical element 110. As a result, a wafer pattern is always detected so as to obtain a desired wafer pattern, and maintained within a desired standard.

Alternatively, there is a processor that measures a strain amount of the hook 131 and calculates a relationship between the measured amount and a force to be applied to the optical element when the strain amount occurs, or a memory that stores the relationship. In this case, it is determined whether or not the strain amount of the hook 131 is within a permissible range, and if it is determined within the permissible range, the force to be applied to the optical element is maintained.

While FIGS. 1 and 2 arrange three adjustment units 130 and strain gauges (as a detector) 134 at intervals of three support parts 122, but the present invention is not limited to this configuration. Presumably, the optical element 110 similarly deforms in three spaces among the three support parts. That is, if a deformation amount of the optical element in one space or a measured strain amount by the strain gauge in one space is known, a deformation amount of the optical element or a measured strain amount by the strain gauge in the other remaining spaces can be inferred easily. Therefore, the strain gauge is arranged in at least one space among three spaces among the three support parts, and the adjustment units in other spaces may control, based on the strain measured by the strain gauge, forces applied to the optical element.

Figure 10:
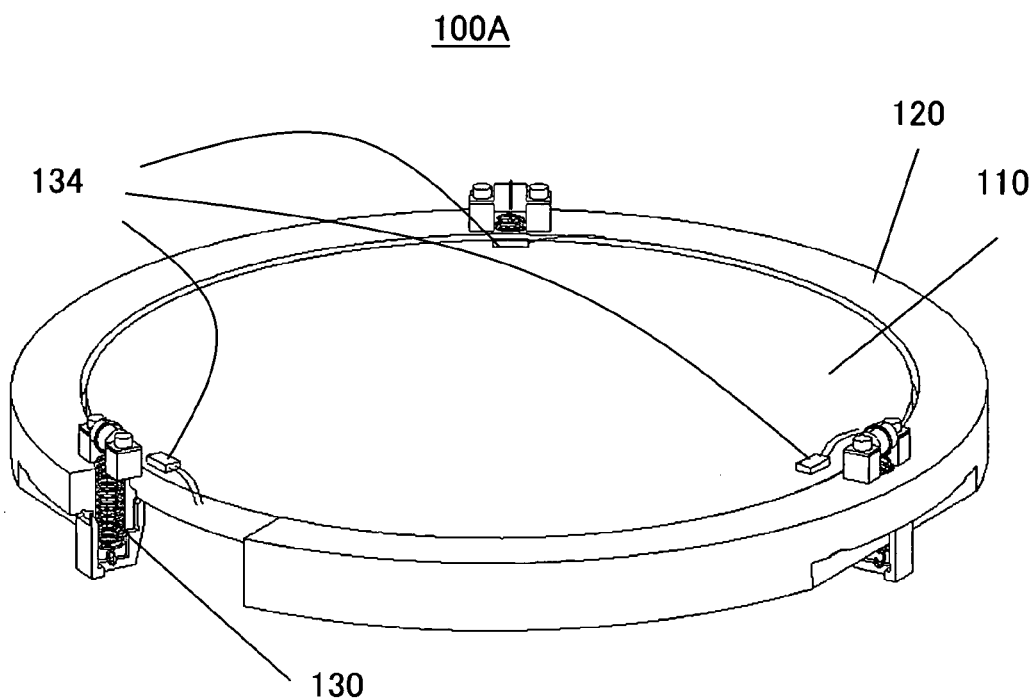
FIG. 10 is a schematic perspective view of a variation of the retainer shown in FIG. 1.

Referring now to FIG. 10, a description will be given of a retainer 101A as a variation of the retainer 100. FIG. 10 is a schematic perspective view of the retainer 100A as a variation of the retainer 100.

The retainer 100A measures, as shown in FIG. 10, a deformation of the optical element 110 by adhering a strain gauge 134 directly to the optical element 110. An adhesion of the strain gauge 134 to a top or bottom surface of the optical element 110, which is held by the retaining member 120, outside the effective radius, enables the strain gauge 134 to detect a deformation of the optical element 110. The optical element 110 is retained by three-point supporting, an adhesion of the entire peripheral, a mechanical retaining method, or the like.

A description will be given of use of the strain gauge 134 adhered onto the optical element 110. First, the strain gauge 134 is adhered onto the optical element 110 before the optical element 110, which has a processed surface shape within an optical design value standard, is adhered and fixed onto the retaining member 120. Then, an output value is read out from the strain gauge 134.

Next follows a mount of the optical element 110 onto the retaining member 120, and an arrangement of the adjustment unit 130. An output value is read out from the strain gauge before or after the final stage where the retainer 100 that retains, the optical element 100 is installed into the apparatus. A deformation (or the optical element 110's deformation by its own weight) as a result of holding the optical element 110 can be measured by reading a difference between the output value at that time and the initial value (i.e., an output value before the optical element 110 is not adhered or fixed onto the retaining member 120).

A deformation as a result of holding the optical element 110 can be cancelled out when the adjustment unit 130 adjusts the output value of the strain gauge 134 close to the initial value.

A description will be given of another use of the strain gauge 134 adhered and fixed onto the optical element 110. First, the strain gauge 134 is adhered and fixed onto the optical element 110 held by the retaining member 120. The adjustment unit 130 varies stepwise a shape of the optical element 110, and measures a deformation amount of the optical element 110 for each stage from output values from the strain gauge 134. This previously obtained correlation between a deformation amount of the optical element 110 and an output value of the strain gauge 134 would be able to deform the optical element 110 into a desired shape only through adjustments by the adjustment unit 130 from the outside of the lens barrel into which the retainer 100 holding the optical element 110 is incorporated. This method can be realized without considering strain gauge 134's attachment errors, and adjustment unit 130's assembly and processing errors.

Figure 11:
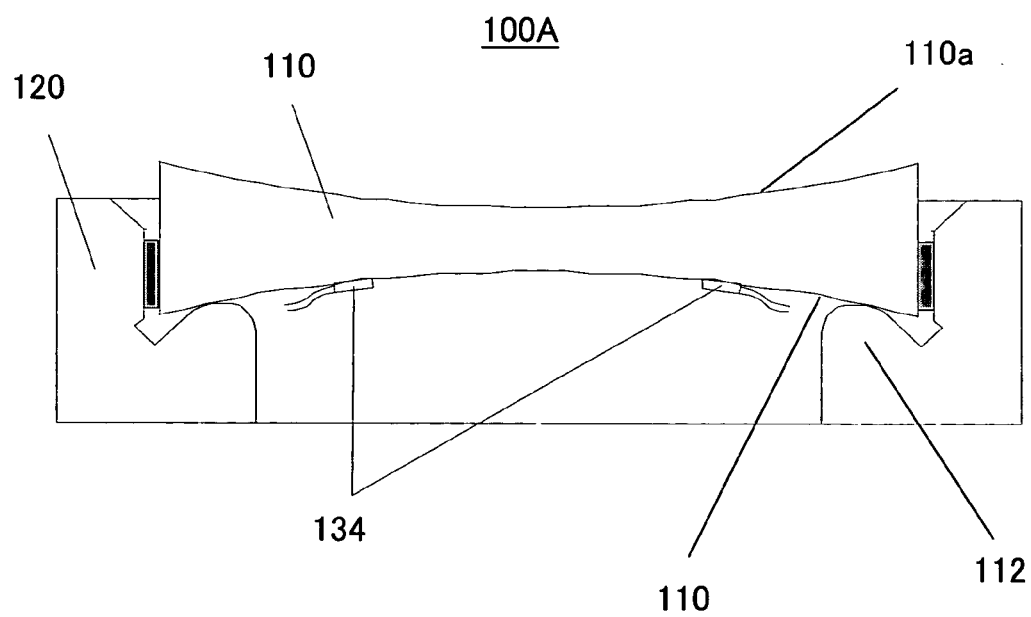
FIG. 11 is a schematic sectional view of a retainer that holds an optical element as a mirror.

The strain gauge 134 can similarly be adhered directly onto the optical element 110 even as a mirror. The strain gauge 134 adhered onto a rear surface 110b opposite to a reflective surface 110a of the optical element 110 as a mirror, as shown in FIG. 11, would be able to detect large strains for precise measurements. FIG. 11 is a schematic sectional view of the retainer 100A when the optical element 110 is a mirror.

Figure 12:
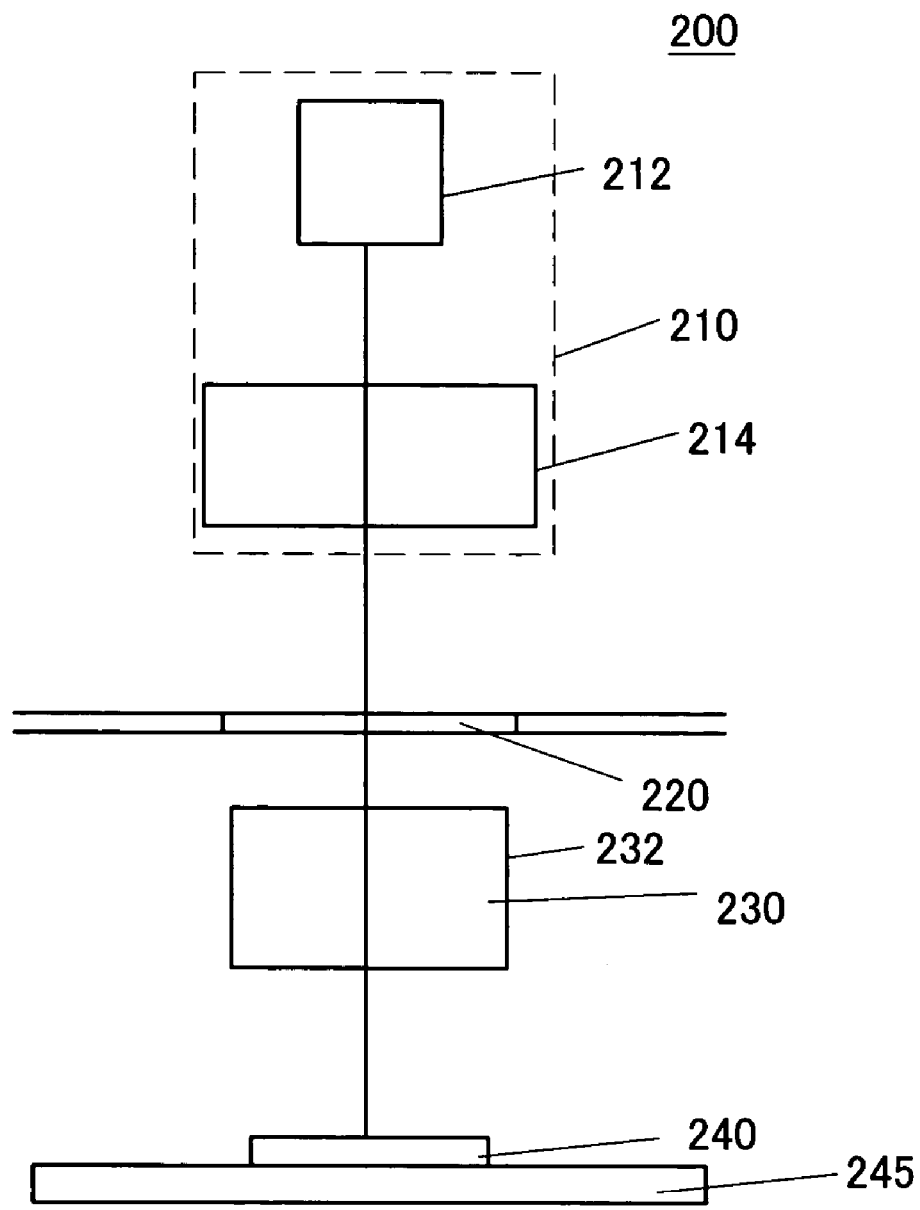
FIG. 12 is a schematic block diagram of an exposure apparatus of one aspect according to the present invention.

Referring now to FIG. 12, a description will be given of the projection optical system 230 to which the inventive retainer 100 is applied and the exposure apparatus 200 having the same. Here, FIG. 12 is a schematic block diagram of the illustrative exposure apparatus 200 of the instant embodiment. The exposure apparatus 200 includes, as shown in FIG. 12, an illumination apparatus 210 for illuminating a mask 220 which forms a circuit pattern, a projection optical system 230 that projects diffracted light created from the illuminated mask pattern onto a plate 240, and a stage 245 for supporting the plate 240.

The exposure apparatus 200 is a projection exposure apparatus that exposes onto the plate 240 a circuit pattern created on the mask 220, e.g., in a step-and-repeat or a step-and-scan manner. Such an exposure apparatus is suitable for a sub-micron or quarter-micron lithography process, and this embodiment exemplarily describes a step-and-scan exposure apparatus (which is also called "a scanner"). "The step-and-scan manner", as used herein, is an exposure method that exposes a mask pattern onto a wafer by continuously scanning the wafer relative to the mask, and by moving, after a shot of exposure, the wafer stepwise to the next exposure area to be shot. "The step-and-repeat manner" is another mode of exposure method that moves a wafer stepwise to an exposure area for the next shot every shot of cell projection onto the wafer.

The illumination apparatus 210 illuminates the mask 220 which forms a circuit pattern to be transferred, and includes a light source unit 212 and an illumination optical system 214.

The light source unit 212 uses as a light source, for example, as ArF excimer laser with a wavelength of approximately 193 nm, a KrF excimer laser with a wavelength of approximately 248 nm, and $F_2$ excimer laser with a wavelength of approximately 153 nm, but the a type of laser is not limited to excimer laser and a YAG laser may be, for example. Similarly, the number of laser units is not limited. $F_2$ laser with a wavelength of about 157 nm and an extreme ultraviolet ("EUV") light source with a wavelength between about 10 nm and about 20 nm are also applicable. For example, two independently acting solid lasers would cause no coherence between these solid lasers and significantly reduces speckles resulting from the coherence. An optical system for reducing speckles may swing linearly or rotationally. When the light source unit 212 uses laser, it is desirable to employ a beam shaping optical system that shapes a parallel beam from a laser source to a desired beam shape, and an incoherently turning optical system that turns a coherent laser beam into an incoherent one. A light source applicable to the light source unit 212 is not limited to a laser., and may use one or more lamps such as a mercury lamp and a xenon lamp.

The illumination optical system 214 is an optical system that illuminates the mask 220, and includes a lens, a mirror, a light integrator, a stop, and the like, for example, a condenser lens, a fly-eye lens, an aperture stop, a condenser lens, a slit, and an image-forming optical system in this order. The illumination optical system 214 can use any light whether it is axial or non-axial light. The light integrator may include a fly-eye lens or an integrator formed by stacking two sets of cylindrical lens array plates (or lenticular lenses), and be replaced with an optical rod or a diffractive element. The aperture stop can include an annular illumination stop and a quadrupole illumination stop for modified illumination that improves resolution. The inventive retainer 100 may be used to hold the optical element, such as a lens in the illumination optical system 214.

The mask 220 is made, for example, of quartz, forms a circuit pattern (or an image) to be transferred, and is supported and driven by a mask stage (not shown). Diffracted light emitted from the mask 220 passes the projection optical system 230, thus and then is projected onto the plate 240. The mask 220 and the plate 240 are located in an optically conjugate relationship. Since the exposure apparatus 200 of this embodiment is a scanner, the mask 220 and the plate 240 are scanned at the speed ratio of the reduction ratio of the projection optical system 230, thus-transferring the pattern on the mask 220 to the plate 240. If it is a step-and-repeat exposure apparatus (referred to as a "stepper"), the mask 220 and the plate 240 stand still in exposing the mask pattern.

The projection optical system 230 may use an optical system solely including a plurality of lens elements, an optical system including a plurality of lens elements and at least one concave mirror (a catadioptric optical system), an optical system including a plurality of lens elements and at least one diffractive optical element such as a kinoform, and a full mirror type optical system, and so on. Any necessary correction of the chromatic aberration may use a plurality of lens units made from glass materials having different dispersion values (Abbe values), or arrange a diffractive optical element such that it disperses in a direction opposite to that of the lens unit.

Figure 13:
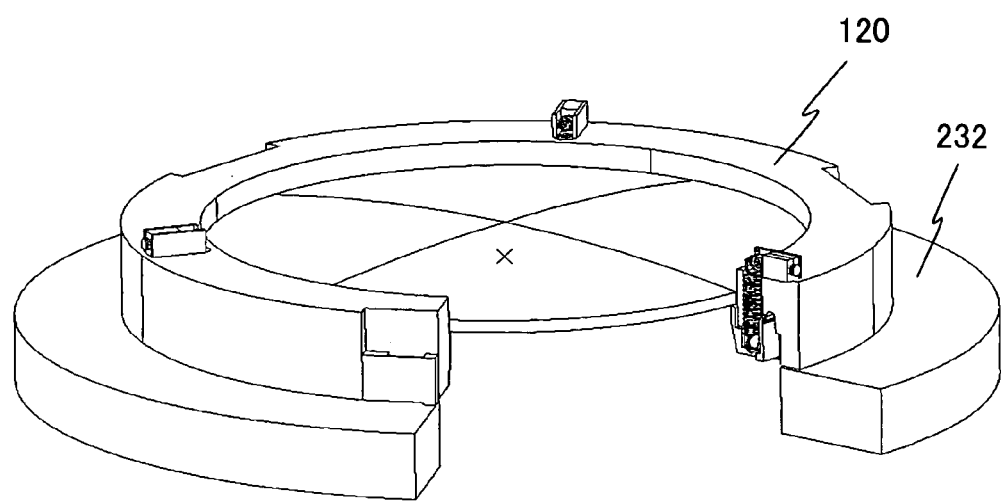
FIG. 13 is a schematic, partial sectional, perspective view in a lens barrel in the inventive exposure apparatus.

The inventive retainer 100 may be used to hold the optical element, such as a lens in the projection optical system 230. The retainer 100 is connected to the lens barrel 232 in the projection optical system 230 through the absorptive member 122 that is provided on the retaining member 120, as shown in FIG. 13, and may absorb radial deformations. This structure may prevent the retaining member 120 from decentering due to a relative displacement between the lens barrel 232 and the retaining member 120, which relative displacement results from different coefficients of linear expansion between them, when the temperature environment changes, for example, in carrying the apparatus. Here, FIG. 13 is a schematic, partial sectional, perspective view in the lens barrel 232 in the exposure apparatus 200.

Due to the above structured retainer 100, the projection optical system 230 may achieve desired optical performance by reducing the aberration that results from the deformation and positional offset of the optical element 110 which otherwise deteriorates imaging performance.

The plate 240 is an object to be exposed such as a wafer and a liquid crystal plate, and photoresist is applied onto it. A photoresist application step includes a pretreatment, an adhesion accelerator application treatment, a photoresist application treatment, and a pre-bake treatment. The pretreatment includes cleaning, drying, etc. The adhesion accelerator application treatment is a surface reforming process so as to enhance the adhesion between the photo-resist and a base (i.e., a process to increase the hydrophobicity by applying a surface active agent), through a coat or vaporous process using an organic film such as HMDS (Hexamethyldisilazane). The pre-bake treatment is a baking (or burning) step, softer than that after development, which removes the solvent.

The stage 245 supports the plate 240. The stage 240 may use any structure known in the art, and a detailed description of its structure and operation is omitted. The stage 245 may use, for example, a linear motor to move the plate 240 in XY directions. The mask 220 and plate 240 are, for example, scanned synchronously, and the positions of the stage 245 and a mask stage (not shown) are monitored, for example, by a laser interferometer and the like, so that both are driven at a constant speed ratio. The stage 245 is installed on a stage stool supported on the floor and the like, for example, via a damper, and the mask stage and the projection optical system 230 are installed on a lens barrel stool (not shown) supported, for example, via a damper to the base frame placed on the floor.

In exposure, light emitted from the light source 212, e.g., Koehler-illuminates the mask 220 via the illumination optical system 214. Light that passes through the mask 220 and reflects the mask pattern is imaged onto the plate 240 by a magnification of the projection optical system 230, such as ¼ and ⅕. The projection optical system 230 and/or the illumination optical system 214 used for the exposure apparatus 200 include an optical element held by the inventive retainer 100, and reduce the deformation and the aberration resulting from the positional offset of the optical element, thus being able to provide high-quality devices (such as semiconductor devices, LCD devices, photographing devices (such as CCDs, etc.), thin film magnetic heads, and the like).

Figure 14:
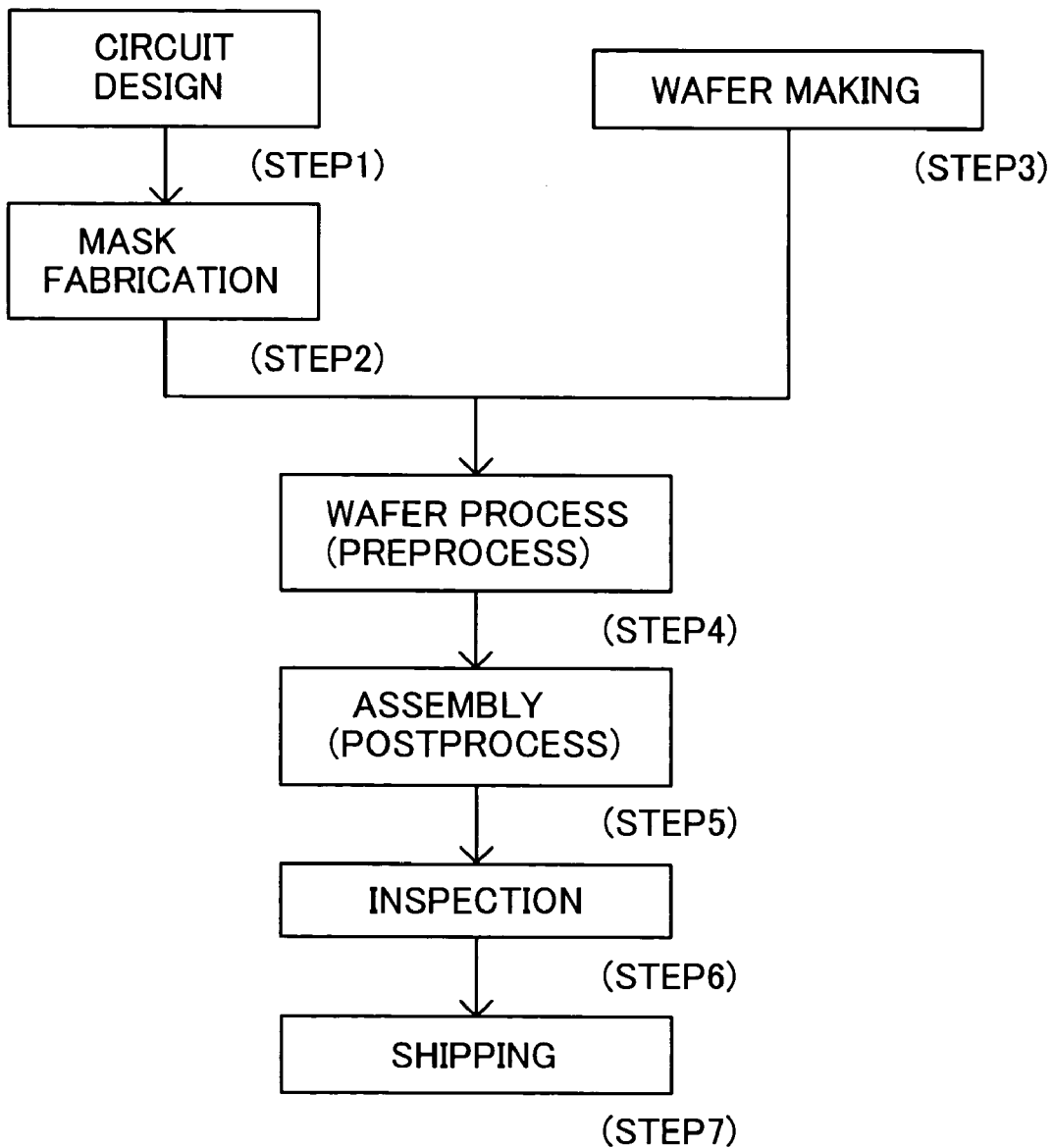
FIG. 14 is a flowchart for explaining a method for fabricating devices (semiconductor chips such as ICs, LSIs, and the like, LCDs, CCDs, etc.).
Figure 15:
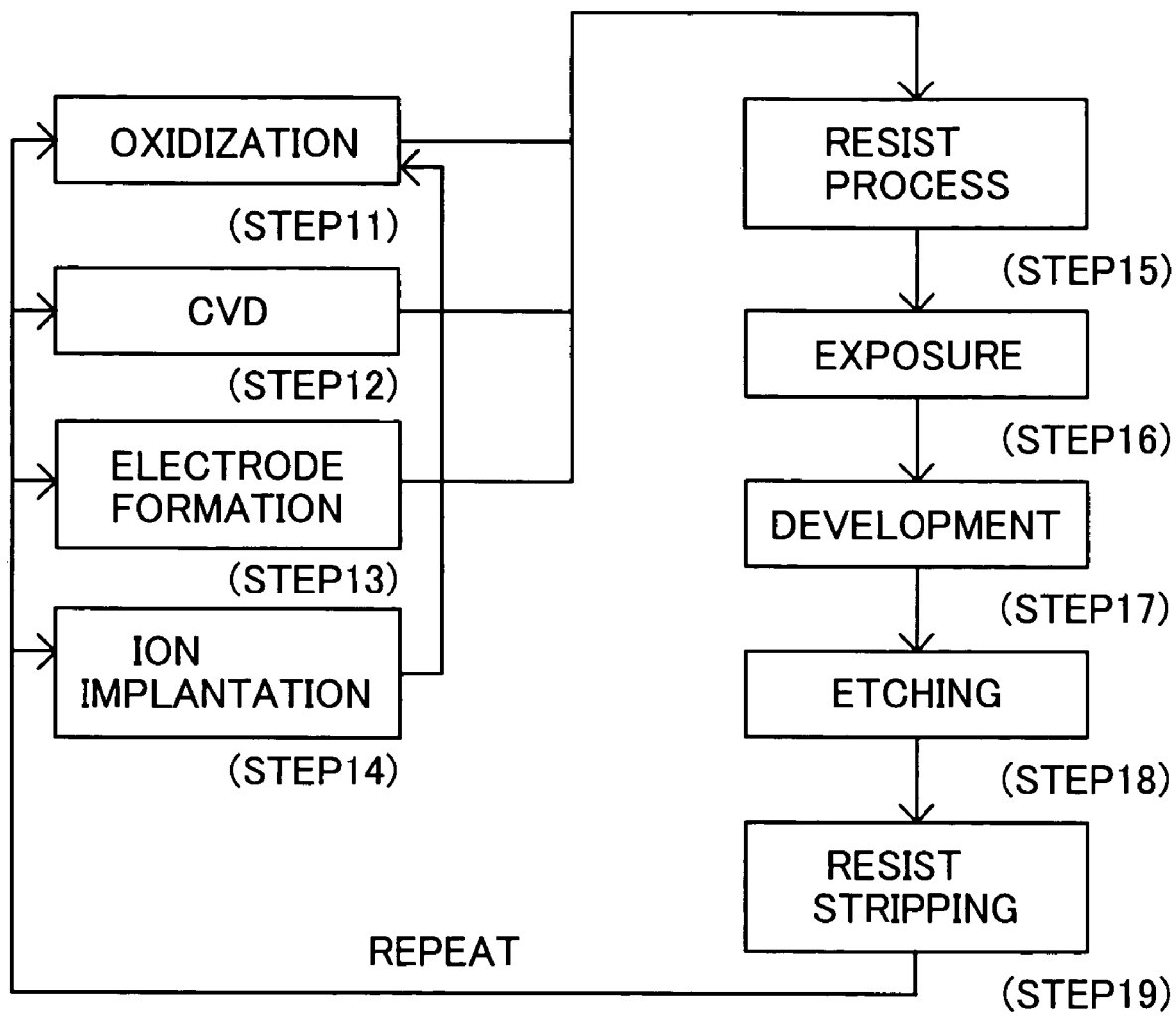
FIG. 15 is a detailed flowchart for Step 4 of wafer process shown in FIG. 14.

Referring now to FIGS. 14 and 15, a description will be given of an embodiment of a device fabrication method using the above mentioned exposure apparatus 200. FIG. 14 is a flowchart for explaining how to fabricate devices (i.e., semiconductor chips such as IC and LSI, LCDs, CCDs, and the like). Here, a description will be given of the fabrication of a semiconductor chip as an example. Step 1 (circuit design) designs a semiconductor device circuit. Step 2 (mask fabrication) forms a mask having a designed circuit pattern. Step 3 (wafer making) manufactures a wafer using materials such as silicon. Step 4 (wafer process), which is also referred to as a pretreatment, forms actual circuitry on the wafer through lithography using the mask and wafer. Step 5 (assembly), which is also referred to as a post-treatment, forms into a semiconductor chip the wafer formed in Step 4 and includes an assembly step (e.g., dicing, bonding), a packaging step (chip sealing), and the like. Step 6 (inspection) performs various tests for the semiconductor device made in Step 5, such as a validity test and a durability test. Through these steps, a semiconductor device is finished and shipped (Step 7). FIG. 15 is a detailed flowchart of the wafer process in Step 4. Step 11 (oxidation) oxidizes the wafer's surface. Step 12 (CVD) forms an insulating film on the wafer's surface. Step 13 (electrode formation) forms electrodes on the wafer by vapor disposition and the like. Step 14 (ion implantation) implants ion into the wafer. Step 15 (resist process) applies a photosensitive material onto the wafer. Step 16 (exposure) uses the exposure apparatus 200 to expose a circuit pattern on the mask onto the wafer. Step 17 (development) develops the exposed wafer. Step 18 (etching) etches parts other than a developed resist image. Step 19 (resist stripping) removes disused resist after etching. These steps are repeated, and multi-layer circuit patterns are formed on the wafer. Use of the fabrication method in this embodiment helps fabricate higher-quality devices than conventional. Thus, the device fabrication method using the exposure apparatus 200, and resultant devices constitute one aspect of the present invention.

Further, the present invention is not limited to these preferred embodiments and various variations and modifications may be made without departing from the scope of the present invention. For example, the inventive retainer may be used to hold various optical elements, such as a lens, mirror, and filter. The inventive retainer may be used to hold a mask and a wafer.

The inventive retainer provides a strain gauge for detecting a shape of an optical element on the optical element or a retaining member that directly holds the optical element, and enables the shape of the optical element to be easily recognized and adjusted based on an output of the strain gauge. Therefore, the inventive retainer can realize a high-resolution projection optical system with desired optical performance by reducing aberration due to a deformation of an optical element which otherwise deteriorates the imaging performance.

What is claimed is:

1. A retainer for holding an optical element, said retainer comprising:
   a detector for detecting a deformation amount of the optical element; and
   an adjustment unit for adjusting the deformation of the optical element by applying a force to the optical element in a direction opposing to a gravity direction based on the deformation amount.

2. A retainer according to claim 1, wherein said detector is a strain gauge.

3. A retainer according to claim 1, wherein said detector is arranged on the optical element.

4. A retainer according to claim 1, wherein three detectors are arranged on the same circumference at a pitch of 120°.

5. A retainer according to claim 1, wherein said adjustment unit equalizes a load applied to the optical element.

6. A retainer according to claim 5, wherein said adjustment unit includes a coil spring.

7. A retainer according to claim 6, wherein said adjustment unit includes an adjustment screw for adjusting a length of the coil spring.

8. A retainer according to claim 1, wherein said adjustment unit adjusts the load applied to the optical element to reduce aberration of the optical element.

9. A retainer according to claim 1, wherein three adjustment units are arranged on the same circumference at a pitch of 120°.

10. A retainer according to claim 1, further comprising a support part that supports the optical element at approximately three points.

11. A retainer according to claim 1 , wherein there are three detectors and three support parts, wherein each detector is arranged between two adjacent supports parts.

12. A retainer according to claim 1, wherein there are three adjustment units and three support parts, wherein each detector is arranged between two adjacent supports parts.

13. A retainer according to claim 1, wherein the number of adjustment units is more than the number of detectors, and said adjustment units are driven based on detection results by said detectors.

14. A retainer according to claim 1, further comprising a support part that supports the optical element at approximately three points, wherein said adjustment unit is provided every space between adjacent two points among the three points, and said detector is located at least one of the spaces among the three points.

15. A retainer according to claim 1, wherein said detector and said adjustment unit are integrated with each other.

16. A retainer according to claim 1, wherein the adjustment unit includes a component, and said detector detects the deformation amount by using the component in said adjustment unit.

17. A retainer according to claim 1, wherein the adjustment unit includes a component, and said detector detects the deformation amount by measuring a strain amount of the component in said adjustment unit.

18. A retainer for holding an optical element, said retainer comprising:
   an adjustment unit for adjusting a shape of the optical element, said adjustment unit including a component; and
   a detector for detecting a deformation amount of the component in said adjustment unit, said adjustment unit adjusting the shape of the optical element by applying a force to the optical element in a direction opposing to a gravity direction based on a detection result by said detector.

19. A retainer according to claim 18, further comprising a support part for supporting the optical element at approximately three points, and adjustment units are arranged at intervals of the approximately three points.

20. An adjustment method for adjusting a shape of an optical element into a desired shape, said method comprising the steps of:
   obtaining the shape of the optical element;
   calculating a force to be applied to the optical element to correct the shape of the optical element into the desired shape; and
   applying the force calculated by said calculating step to the optical element in a direction opposing to a gravity direction.

21. An adjustment method according to claim 20, further comprising the steps of: detecting wave front aberration of the optical element; and applying the force to the optical element so that the wave front aberration falls within a permissible range.

22. An exposure apparatus comprising:
   a retainer for holding an optical element, said retainer including a detector for detecting a deformation amount in a shape of the optical element, and an adjustment unit for adjusting the shape of the optical element by applying a force to the optical element in a direction opposing to a gravity direction based on the deformation amount; and
   an optical system for exposing a pattern formed on a mask or reticle onto an object through the optical element held by the retainer.

23. An exposure apparatus comprising:
   a retainer for holding an optical element, said retainer including an adjustment unit for adjusting a shape of the optical element, said adjustment unit including a component, and
   a detector for detecting a deformation amount of the component in said adjustment unit, the adjustment unit adjusting the shape of the optical element by applying a force to the optical element in a direction opposing to a gravity direction based on a detection result by said detector; and
   an optical system for exposing a pattern formed on a mask or reticle onto an object through the optical element held by the retainer.

24. A device fabrication method comprising the steps of:
   exposing a pattern on a mask, onto an object by using an exposure apparatus that includes a retainer that includes three support parts for supporting an optical element, a first unit for applying a first elastic force to the optical element in anti-gravity direction, and a second unit, arranged opposite to the first unit through the optical element, for applying a second elastic force to the optical element in a gravity direction, and an optical system for exposing a pattern formed on a mask or reticle onto an object through the optical element held by the retainer; and
   developing the object that has been exposed.

25. A device fabrication method comprising the steps of:
   exposing a pattern on a mask, onto an object by using an exposure apparatus that includes a retainer for holding an optical element, said retainer including an adjustment unit for adjusting a shape of the optical element, said adjustment unit including a component, and a detector for detecting a deformation amount of the component in said adjustment unit, the adjustment unit adjusting the shape of the optical element by applying a force to the optical element in a direction opposing to a gravity direction based on a detection result by said detector, and an optical system for exposing a pattern formed on a mask or reticle onto an object through the optical element held by the retainer; and
   developing the object that has been exposed.

26. A retainer for holding an optical element, said retainer comprising:
   a detector for detecting a deformation amount of the optical element; and
   an adjustment unit for adjusting the deformation of the optical element based on the deformation amount,
   wherein said detector is a strain gauge.

27. A retainer for holding an optical element, said retainer comprising:
   a detector for detecting a deformation amount of the optical element; and
   an adjustment unit for adjusting the deformation of the optical element based on the deformation amount,
   wherein three detectors are arranged on the same circumference at a pitch of 120°.

28. A retainer for holding an optical element, said retainer comprising:
   a detector for detecting a deformation amount or the optical element; and
   an adjustment unit for adjusting the deformation of the optical element based on the deformation amount,
   wherein said adjustment unit equalizes a load applied to the optical element, and includes a coil spring.

29. A retainer for holding an optical element, said retainer comprising:
   a detector for detecting a deformation amount of the optical element; and
   an adjustment unit for adjusting the deformation of the optical element based on the deformation amount,
   wherein said adjustment unit equalizes a load applied to the optical element, and includes a coil spring and an adjustment screw for adjusting a length of the coil spring.

30. A retainer for holding an optical element, said retainer comprising:
   a detector for detecting a deformation amount of the optical element; and
   an adjustment unit for adjusting the deformation of the optical element based on the deformation amount,
   wherein three adjustment units are arranged on the same circumference at a pitch of 120°.

31. A retainer for holding an optical element, said retainer comprising:
   a detector for detecting a deformation amount of the optical element;
   an adjustment unit for adjusting the deformation of the optical element based on the deformation amount; and a support part that supports the optical element at approximately three points.

32. A retainer for holding an optical element, said retainer comprising:
   a detector for detecting a deformation amount of the optical element; and
   an adjustment unit for adjusting the deformation of the optical element based on the deformation amount,
   wherein there are three detectors and three support parts, wherein each detector is arranged between two adjacent supports parts.

33. A retainer for holding an optical element, said retainer comprising:
   a detector for detecting a deformation amount of the optical element; and
   an adjustment unit for adjusting the deformation of the optical element based on the deformation amount,
   wherein there are three adjustment units and three support parts, wherein each detector is arranged between two adjacent supports parts.

34. A retainer fur holding an optical element, said retainer comprising:
   a detector for detecting a deformation amount of the optical element;
   an adjustment unit for adjusting the deformation of the optical element based on the deformation amount; and
   a support part that supports the optical element at approximately three points,
   wherein said adjustment unit is provided every space between adjacent two points among the three points, and said detector is located at least one of the spaces among the three points.

35. A retainer for holding an optical element, said retainer comprising:
   a detector for detecting a deformation amount of the optical element; and
   an adjustment unit for adjusting the deformation of the optical element based on the deformation amount,
   wherein said detector and said adjustment unit are integrated with each other.

36. A retainer for holding an optical element, said retainer comprising:
   a detector for detecting a deformation amount of the optical element; and
   an adjustment unit for adjusting the deformation of the optical element based on the deformation amount.
   wherein the adjustment unit includes a component, and said detector detects the deformation amount by measuring a strain amount of the component in said adjustment unit.

37. A retainer for holding an optical element, said retainer comprising:
   an adjustment unit for adjusting a shape of the optical element, said adjustment unit including a component;
   a detector for detecting a deformation amount of the component in said adjustment unit, said adjustment unit adjusting the shape of the optical element based on a detection result by said detector; and
   a Support part for supporting the optical element at approximately three points,
   wherein adjustment units are arranged at intervals of the approximately three points.

38. An adjustment method for adjusting a shape of an optical element into a desired shape, said method comprising the steps of:
   obtaining the shape of the optical element;
   calculating a force to be applied to the optical element to correct the shape of the optical element into the desired shape;
   applying the force calculated by said calculating step to the optical element;
   detecting wave front aberration of the optical element; and
   applying the force to the optical element so that the wave front aberration falls within a permissible range.

* * * * *

UNITED STATES PATENT AND TRADEMARK OFFICE
CERTIFICATE OF CORRECTION

PATENT NO. : 7,031,082 B2  Page 1 of 1
APPLICATION NO. : 10/781412
DATED : April 18, 2006
INVENTOR(S) : Murasato It is certified that error appears in the above-identified patent and that said Letters Patent is hereby corrected as shown below:

In the Specification:

In col. 6, line 20, please replace "the 131" with --the hook 131--.

In col. 6, line 53, please replace "120." with --120 in FIG. 4--.

In the Claim:

In claim 24 (col. 15, line 65), please replace "anti-gravity" with --an anti-gravity--.

In claim 28 (col. 16, line 38), please replace "amount or" with --amount of--.

In claim 37 (col. 18, line 20), please replace "a Support" with --a support--.

Signed and Sealed this

Third Day of April, 2007

JON W. DUDAS
*Director of the United States Patent and Trademark Office*